United States Patent
Cudak et al.

(10) Patent No.: US 10,207,177 B2
(45) Date of Patent: Feb. 19, 2019

(54) GAME INCENTIVIZED OPTIMIZATION OF RESOURCE UTILIZATION

(71) Applicant: International Business Machines Corporation, Armonk, NY (US)

(72) Inventors: Gary D. Cudak, Creedmoor, NC (US); Christopher J. Hardee, Raleigh, NC (US); Adam Roberts, Moncure, NC (US); Adrian X. Rodriguez, Durham, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 1041 days.

(21) Appl. No.: 14/218,909

(22) Filed: Mar. 18, 2014

(65) Prior Publication Data
US 2015/0265919 A1    Sep. 24, 2015

(51) Int. Cl.
*A63F 13/00*    (2014.01)

(52) U.S. Cl.
CPC .................................. *A63F 13/00* (2013.01)

(58) Field of Classification Search
CPC ............................... A63F 13/355; A63F 13/00
USPC .......................................................... 463/42
See application file for complete search history.

(56) References Cited

U.S. PATENT DOCUMENTS

| | | | |
|---|---|---|---|
| 8,260,873 B1* | 9/2012 | Kandekar | H04L 67/38 463/42 |
| 2001/0044339 A1* | 11/2001 | Cordero | A63F 13/12 463/42 |
| 2008/0293488 A1* | 11/2008 | Cheng | A63F 13/10 463/31 |
| 2012/0142429 A1* | 6/2012 | Muller | A63F 13/12 463/42 |
| 2013/0260891 A1 | 10/2013 | Kruglick | |
| 2014/0004952 A1* | 1/2014 | Kern | G07F 17/3258 463/42 |

* cited by examiner

*Primary Examiner* — Omkar Deodhar
*Assistant Examiner* — Wei Lee
(74) *Attorney, Agent, or Firm* — Steven M. Greenberg, Esq.; Shutts & Bowen LLP

(57) ABSTRACT

Embodiments of the present invention provide a method, system and computer program product for game incentivized resource utilization optimization in a multiplayer gaming environment. In an embodiment of the invention, a method for game incentivized resource utilization optimization in a multiplayer gaming environment is provided. The method includes hosting a multiplayer gaming environment providing a game amongst a selection of servers in a cluster and detecting overutilization of a resource in one of the servers. A remedial action likely to reduce the overutilization can be identified as can an incentive of the game likely to provoke the identified remedial action. Thereafter, the identified game incentive can be provided to a player in the multiplayer gaming environment.

14 Claims, 2 Drawing Sheets

GAME INCENTIVIZED OPTIMIZATION OF RESOURCE UTILIZATION

BACKGROUND OF THE INVENTION

Field of the Invention

The present invention relates to computerized gaming and more particularly to resource utilization in gaming.

Description of the Related Art

A multiplayer video game is one which multiple players can concurrently play a game within the same gaming environment. While single player games which have dominated computer gaming pit a single player against one or more automated opponents engaging in pre-programmatic behavior, multiplayer games pit different individuals against one another, each being limited to dynamic, on the fly behavior limited by the power of human thinking. Multiplayer games also often provide a game environment in which different players engage in allied competition against other players whether human or computer automated. In the latter instance, cooperative multiplayer gaming environments reflect a 21st century version of the role playing board games of the 20th century.

Technologically, multiplayer gaming environments can be supported within a single gaming console, or in a distributed fashion over a computer communications network. In fact, some relatively recent multiplayer gaming environments are supported by geographically remote players communicatively connected to one another over the Internet through gaming consoles, personal computers, smart phone, personal digital assistants, or any combination thereof. However, in all instances, the virtual world in which the multiple players interact must remain consistent for all players.

The virtual world of a multiplayer gaming environment often can be divided into a virtual geography with each realm or zone of the geography being hosted in actuality by one or more different servers. It is preferred from the as many locations of a virtual world are hosted on as few servers as possible for the purpose of simple economy. In this regard, it is to be recognized that servers each have a cost, not only in acquisition, but also in operation—particularly in respect to power consumption. As a gaming environment can require the presence of tens of thousands of host computers, each with one or more processor cores and terabytes of memory, the resultant power consumption can be astronomical in scale.

Given the vast number of servers involved in supporting a multiplayer gaming environment, players of a multiplayer gaming environment often can create load imbalances amongst the servers as players move from zone to zone, and thereby from server to server. As such, performance of the entire gaming environment can suffer without warning. Migrating players away from the overloaded locations and hence overloaded servers can reduce or eliminate the load imbalance. To achieve the desired migration, players are often forced to migrate to other servers and hence other locations of the virtual world, the performance of players can be intentionally reduced, or players can be compelled to wait in a queue during the login process for a particular location or corresponding server. As such, players can be denied access to a desired virtual location of a virtual world at a desired moment in a game.

BRIEF SUMMARY OF THE INVENTION

Embodiments of the present invention address deficiencies of the art in respect to optimizing resource utilization in a set of servers supporting a multiplayer gaming environment and provide a novel and non-obvious method, system and computer program product for game incentivized resource utilization optimization in a multiplayer gaming environment. In an embodiment of the invention, a method for game incentivized resource utilization optimization in a multiplayer gaming environment is provided. The method includes hosting a multiplayer gaming environment providing a game amongst a selection of servers in a cluster and detecting overutilization of a resource in one of the servers. A remedial action likely to reduce the overutilization can be identified as can an incentive of the game likely to provoke the identified remedial action. Thereafter, the identified game incentive can be provided to a player in the multiplayer gaming environment.

In one aspect of the embodiment, the remedial action can be moving the player from a location of a virtual world of the game supported by the one of the servers to a different location of virtual world of the game supported by a different one of the servers. In another aspect of the embodiment, the remedial action can be a reduction in game features. In yet another aspect of the embodiment, the remedial action can be a reduction in game complexity or a reduction in player mobility of the player. Finally, in even yet another aspect of the embodiment, the incentive can be a notification presented to the player in the game of a presence of related players in the different location, or an enhancement of player characteristics in the game.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for game incentivized resource utilization optimization in a multiplayer gaming environment. In accordance with an embodiment of the invention, a correlation can be determined between reduced resource utilization of the resources of one or more of the servers supporting the gaming environment, and different game events that occur in the course of a game instance provided in the gaming environment. Further, additional correlations can be mapped between different game parameters of the game and the occurrence of the game events correlated with the reduced resource utilization, for example the movement of a player from one location to another, or the limitation of the player in participating in co-operative activities in favor of solitary activities.

Thereafter, in response to detecting undesirable resource utilization in the gaming environment, one or more of the game parameters can be adjusted so as to provoke one or more of the game events likely to reduce resource utilization, for example the movement of a player from one location to another, or the limitation of the player in participating in co-operative activities in favor of solitary activities. In this way, the players of the game can be co-opted voluntarily into a desired reduction of resource utilization amongst the servers of the gaming environment.

Figure 1:
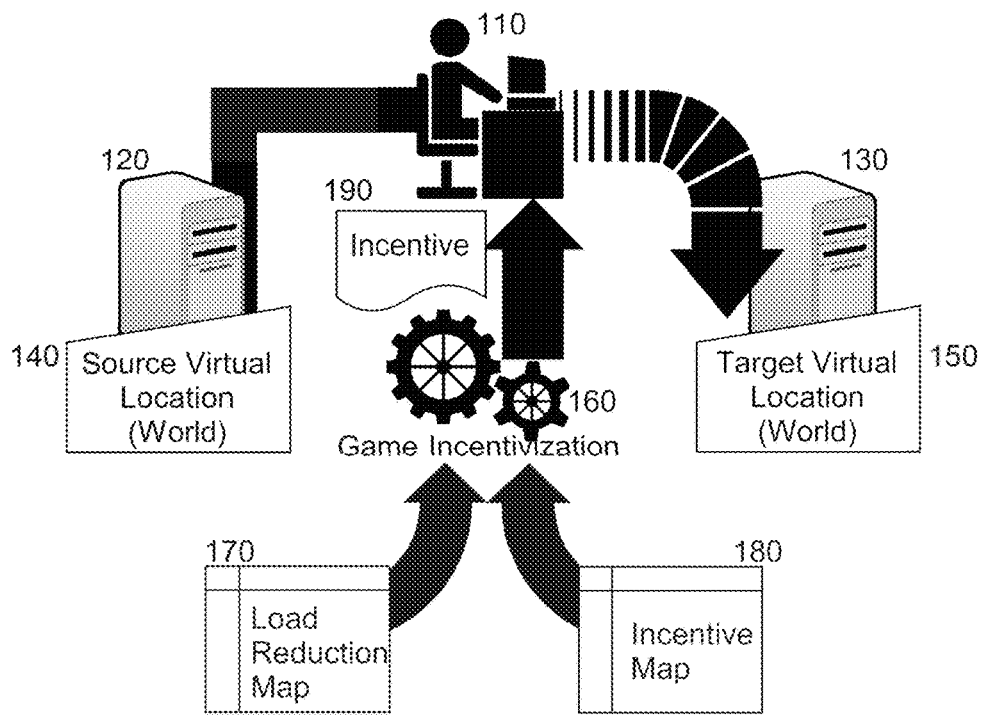
FIG. 1 is a pictorial illustration of a process for game incentivized resource utilization optimization in a multiplayer gaming environment.

In further illustration, FIG. 1 pictorially shows a process for game incentivized resource utilization optimization in a multiplayer gaming environment. As shown in FIG. 1, an end user 110 can interact with a game environment of different portions 140, 150 each hosted within a respective one of different servers 120, 130. A load reduction mapping 170 can be generated correlating different resource utilization conditions and corresponding remedial actions requisite to remediating the utilization conditions. Such remedial measures may include by way of example, the incentivized movement of a player from one location on one server to another location hosted by another server, or the incentivized limitation of the player in participating in co-operative activities such as "Player versus Player" or "Co-operative Adventuring" in favor of solitary activities, such as "Crafting" or "Farming". Further, a mapping of incentives 180 can be formulated correlating different game incentives each likely to provide a corresponding remedial action present in the load reduction mapping 170.

In operation, game incentivization logic 160 can monitor a degree of utilization of a resource of the servers 120, 130 such that an overutilization condition can be determined. Subsequently, the game incentivization logic 160 can identify from the load reduction mapping 170 one or more remedial actions requisite to remediating the determined overutilization condition. The remedial actions can include relocating the end user 110 from a source one of the servers 120 to a target one of the servers 130, reducing the nature of activities by the end user 110 from co-operative activities to solitary activities, deactivating one or more game features operable in the location 140 of the source one of the servers 120, or eliminating or slowing a pace of game event occurrences in the location 140. Thereafter, the mapping of incentives 180 can be consulted to identify one or more incentives 190 likely to provoke the identified remedial actions and the game incentivization logic 160 can communicate the incentive or incentives 190 to the end user 110.

For example, the game incentivization logic 160 can detect that a source one of the servers 120 hosting one location 140 of a virtual world provided by the gaming environment has achieved overutilization beyond a threshold level. In response, the game incentivization logic 160 can identify within the load reduction mapping 170 a remedial action likely to remediate the overutilization—for instance by relocating the end user 110 to a target one of the server 130 hosting a different location 150 of the virtual world. The game incentivization logic 160 yet further can determine from the mapping of incentives 190 likely to achieve the remedial action, such as an incentive 190 to provoke the end user 110 to move to the different location 150 or an incentive to engage or to avoid engaging in one or more game activities. Such incentives 190 also may include notifying the end user 110 that one or more other end users are present in the different location 150, providing enhanced game capabilities or game rewards to the end user 110 or activating events in the different location 150 likely to attract the end user 110 to the different location 150.

Figure 2:
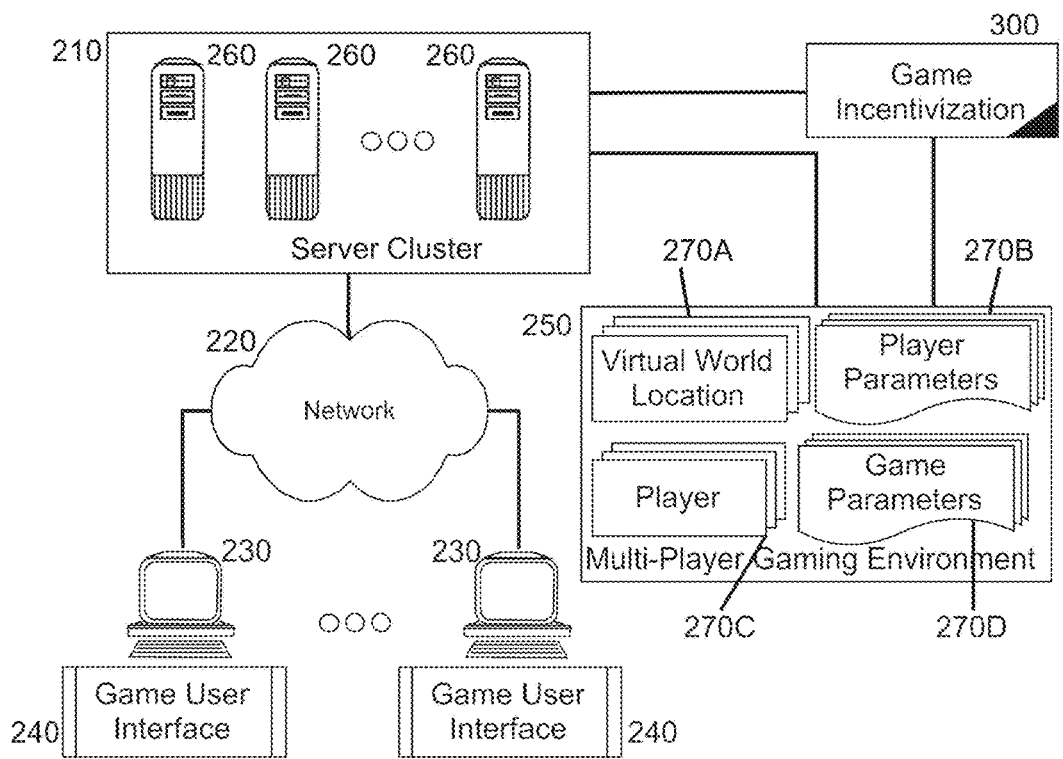
FIG. 2 is a schematic illustration of a multiplayer gaming data processing system configured for game incentivized resource utilization optimization; and, FIG. 3 is a flow chart illustrating a process for game incentivized resource utilization optimization in a multiplayer gaming environment.

The process described in connection with FIG. 1 can be implemented within a multiplayer gaming data processing system. In yet further illustration, FIG. 2 schematically shows a multiplayer gaming data processing system configured for game incentivized resource utilization optimization. The system can include a cluster of servers 210 including several different servers 260 communicatively coupled to one another and hosting a multiplayer gaming environment 250. The multiplayer gaming environment 250 can provide different locations 270A of a virtual world in which different players 170C interact according to different player parameters 270B and different game parameters 270D. The actions of the different players 170C an be controlled by end users from over a computer communications network 220 through different host computers 230 each with a respective game user interface 240.

Of note, a game incentivization module 300 can be coupled to the multiplayer gaming environment. The game incentivization module 300 can include program code that when executes in memory of a computer, measures resource utilization in one or more of the servers 260 and, in response to measured resource utilization in one of the servers 260 exceeding a threshold value, determines a remedial measure likely to reduce the measured resource utilization and a corresponding incentive in the multiplayer gaming environment 250 likely to provoke the remedial measure. The program code of the game incentivization module 300 also can be enabled to provide the determined incentive to one of the players 270C present in a location serviced by the one of the servers 260 in which resource utilization has been measured to have exceeded the threshold value.

Figure 3:
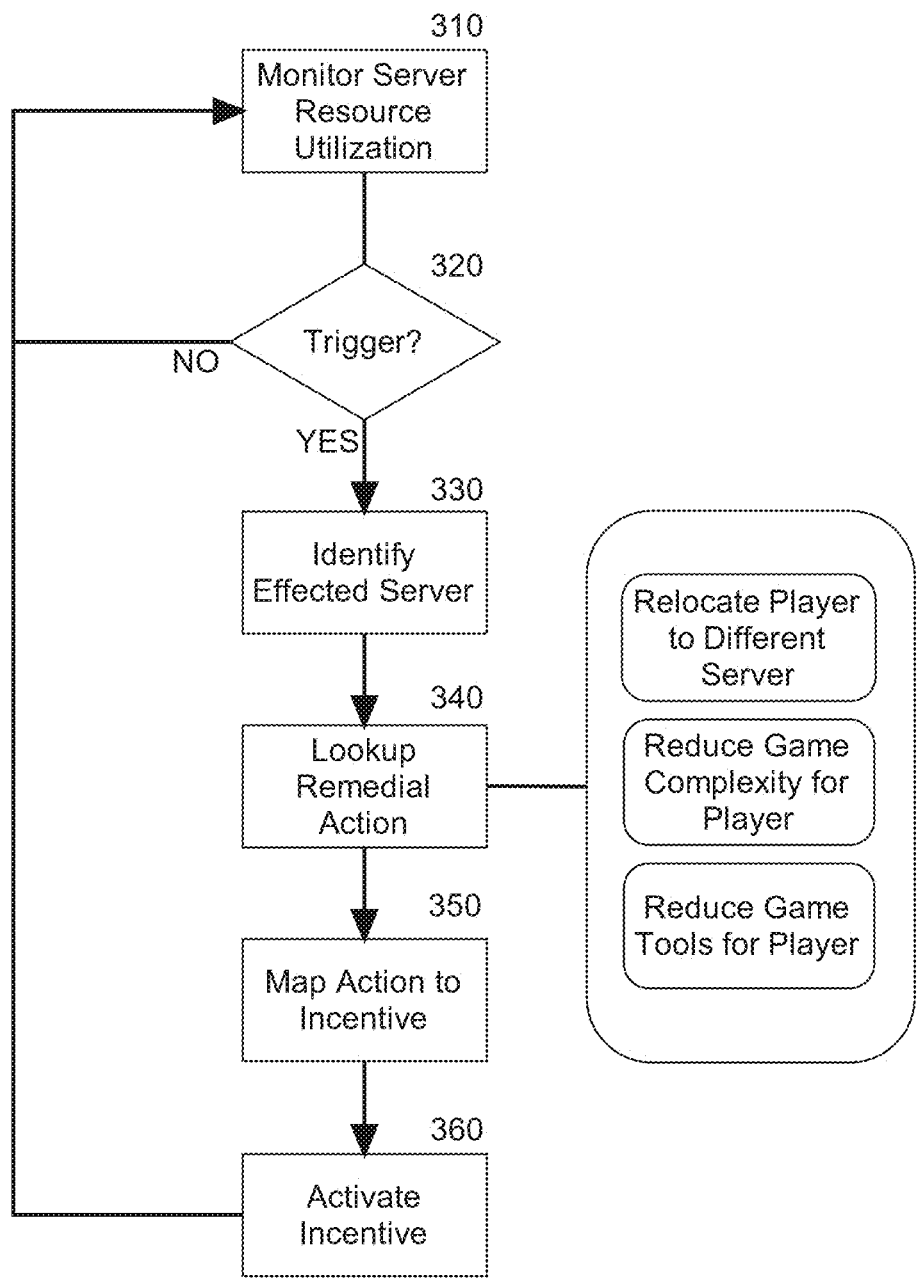

In even yet further illustration of the operation of the game incentivization module 300, FIG. 3 is a flow chart illustrating a process for game incentivized resource utilization optimization in a multiplayer gaming environment. Beginning in block 310, resource utilization can be monitored in one or more servers of a cluster of servers supporting a multiplayer gaming environment. The monitored resources can include power usage, processor usage, memory usage and network communications bandwidth usage. In decision block 320, it can be determined whether or not any of the monitored resources demonstrates utilization that exceeds a threshold value, or in the alternative, is likely to exceed a threshold value based upon an environmental condition such as a time of day, or a placement of a particular number of end users as players in a particular location of a virtual world of the gaming environment.

In decision block 320, if a threshold utilization of the resources of one of the servers is determined, then in block 330 the server of the cluster affected by the determined overutilization can be identified and in block 340, one or more remedial actions can be located that are likely to remediate the overutilization. Those actions can include removing one or more features from the gaming environment at the location supported by the affected server. Examples include eliminating features of the virtual world that require excess resources to present within the location, temporarily eliminating access to player to player communications or player versus player activities, or restricting or slowing player movements about the location or between different locations. Another remedial action can include the relocation of one or more players from the affected location to a location supported by a server less burdened in terms of resource utilization.

In block 350, one or more game incentives can be identified that are known to provoke the located remedial action or actions. The incentives can include, by way of example, the enhancement of player capabilities or assets including providing the player with new assets to be used in the multiplayer gaming environment, or providing the player with improved player characteristics such as improved strength, skills or healing. Other incentives include providing game currency to the players, reducing the cost of acquiring different game assets, or providing additional time for the players to complete a required task. An additional incentive can include notifying the player of the presence of other, related players in a location supported by a server less burdened in terms of resource utilization, or instituting an activity of interest in a location supported by a server less burdened in terms of resource utilization. Thereafter, in block 360 the identified incentive or incentive can be presented to the player or players so as to provoke the desire remedial affect.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for game incentivized resource utilization optimization in a multiplayer gaming environment, the method comprising:
   hosting a multiplayer gaming environment providing a game amongst a selection of servers in a cluster;
   detecting overutilization of a resource in one of the servers;
   identifying a remedial action associated with a reduction in the overutilization, the remedial action comprising at least moving the player from a location of a virtual world of the game supported by the one of the servers to a different location of virtual world of the game supported by a different one of the servers;
   further identifying a presence of related players in the different location of the virtual world of the game supported by a different one of the servers;
   consulting a mapping of incentives with the identified remedial action to identify an incentive of the game associated with a provocation of the identified remedial action, the incentive comprising a notification presented to the player in the game of the presence of the related players in the different location; and,
   providing the identified game incentive to a player in the multiplayer gaming environment.

2. The method of claim 1, wherein the remedial action is additionally includes a limitation of the player from engaging in cooperative activities with other players in favor of solitary activities.

3. The method of claim 1, wherein the remedial action additionally includes a reduction in game complexity.

4. The method of claim 1, wherein the incentive additionally includes an incentive provided to the player to engage or to avoid engaging in one or more game activities.

5. The method of claim 1, wherein the incentive additionally includes an enhancement of player characteristics in the game.

6. A multiplayer gaming data processing system configured for game incentivized resource utilization optimization, the system comprising:
   a set of servers communicatively coupled to one another, each hosting a location of a virtual world of a game in a multiplayer gaming environment; and,
   a game incentivization module coupled to the multiplayer gaming environment, the module comprising program code enabled upon execution in memory of a computer to detect overutilization of a resource in one of the servers, to identify a remedial action associated with a reduction in overutilization, the remedial action comprising at least moving the player from a location of a virtual world of the game supported by the one of the servers to a different location of virtual world of the game supported by a different one of the servers, to further identify a presence of related players in the different location of the virtual world of the game supported by a different one of the servers, to consult a mapping of incentives with the identified remedial action to identify an incentive of the game associated with a provocation of the identified remedial action, the incentive comprising a notification presented to the player in the game of the presence of the related players in the different location, and to provide the identified game incentive to a player in the multiplayer gaming environment.

7. The system of claim 6, wherein the remedial action additionally includes a limitation of the player from engaging in cooperative activities with other players in favor of solitary activities.

8. The system of claim 6, wherein the remedial action additionally includes a reduction in game complexity.

9. The system of claim 6, wherein the incentive additionally includes an incentive provided to the player to engage or to avoid engaging in one or more game activities.

10. A computer program product for game incentivized resource utilization optimization in a multiplayer gaming environment, the computer program product comprising a non-transitory computer readable storage medium having program instructions embodied therewith, the program instructions executable by a device to cause the device to perform a method comprising:

hosting, by a device, a multiplayer gaming environment providing a game amongst a selection of servers in a cluster;

detecting, by a device, overutilization of a resource in one of the servers;

identifying, by a device, a remedial action associated with a reduction in overutilization, the remedial action comprising at least moving the player from a location of a virtual world of the game supported by the one of the servers to a different location of virtual world of the game supported by a different one of the servers; further identifying, by a device a presence of related players in the different location of the virtual world of the game supported by a different one of the servers; consulting a mapping of incentives with the identified remedial action to identify an incentive of the game associated with a provocation of the identified remedial action, the incentive comprising a notification presented to the player in the game of the presence of the related players in the different location; and, providing, by a device, the identified game incentive to a player in the multiplayer gaming environment.

11. The computer program product of claim 10, wherein the remedial action additionally includes a limitation of the player from engaging in cooperative activities with other players in favor of solitary activities.

12. The computer program product of claim 10, wherein the remedial action additionally includes a reduction in game complexity.

13. The computer program product of claim 10, wherein the incentive additionally includes an incentive provided to the player to engage or to avoid engaging in one or more game activities.

14. The computer program product of claim 10, wherein the incentive additionally includes an enhancement of player characteristics in the game.

\* \* \* \* \*